(12) United States Patent
Schmid

(10) Patent No.: US 6,761,068 B1
(45) Date of Patent: Jul. 13, 2004

(54) MICROMECHANICAL ROTATION RATE SENSOR AND METHOD FOR PRODUCING THE SAME

(75) Inventor: Rainer Schmid, Munich (DE)

(73) Assignee: Fraunhofer-Gesellschaft zur Foerderung der Angewandten Forschung, E.V., Munich (DE)

(*) Notice: Subject to any disclaimer, the term of this patent is extended or adjusted under 35 U.S.C. 154(b) by 0 days.

(21) Appl. No.: 09/806,177

(22) PCT Filed: Sep. 29, 1999

(86) PCT No.: PCT/EP99/07205

§ 371 (c)(1),
(2), (4) Date: Jul. 16, 2001

(87) PCT Pub. No.: WO00/19169

PCT Pub. Date: Apr. 6, 2000

(30) Foreign Application Priority Data

Sep. 29, 1998 (DE) .......................... 198 44 686

(51) Int. Cl.[7] .............................. G01P 3/44; G01P 9/00
(52) U.S. Cl. .................................. 73/504.14; 73/504.02
(58) Field of Search .................. 73/504.02, 504.04, 73/504.14, 504.12, 514.32, 514.38, 504.16

(56) References Cited

U.S. PATENT DOCUMENTS

| | | | | |
|---|---|---|---|---|
| 5,349,855 A | * | 9/1994 | Bernstein et al. | ........ 73/504.16 |
| 5,959,208 A | * | 9/1999 | Muenzel et al. | ......... 73/514.32 |
| 6,392,650 B1 | * | 5/2002 | Morrish et al. | ............. 345/472 |

FOREIGN PATENT DOCUMENTS

| | | | |
|---|---|---|---|
| DE | 19500800 A1 | 1/1995 | |
| DE | 19523895 A1 | 6/1995 | |
| DE | 19526903 A1 | 7/1995 | |
| DE | 19528961 A1 | 8/1995 | |
| DE | 195307036 | 8/1995 | ......... G01P/15/125 |
| DE | 19539049 A1 | 10/1995 | |
| DE | 19528961 C2 | 2/1997 | |
| WO | WO 95/34798 | 12/1995 | ........... G01C/19/56 |
| WO | WO 98/15799 | 4/1998 | ........... G01C/19/56 |

OTHER PUBLICATIONS

Greiger, W. et al.; *New Designs of Micromachined Vibrating Rate Gyroscopes with Decoupled Oscillation Modes;* 1998; Elsevier Science S.A.

Lutz, M. et al.; *A Precision Yaw Rate Sensor in Silicon Micromachining;* 1997; IEEE.

Voss, Ralf, et al.; *Silicon Angular Rate Sensor for Automotive Applications with Piezoelectric Drive and Piezoresistive Read–Out;* 1997; IEEE.

* cited by examiner

*Primary Examiner*—Helen Kwok
(74) *Attorney, Agent, or Firm*—Glenn Patent Group; Michael A. Glenn

(57) ABSTRACT

In a method for producing a micromechanical rotation rate sensor, a wafer stack arrangement is used wherein a substrate wafer arrangement (12, 16) is connected to a structural wafer arrangement (14, 18) by means of an insulating connecting layer (15). The required thickness of the structural wafer arrangement (14, 18) is adjusted by thinning it out, where-upon the structural wafer arrangement is structured so as to define at least one seismic mass (20), a suspension (24) and a spring means (22a, 22b) which connects the seismic mass to the suspension. The connecting layer acts as an etch stop for a dry-etching method in which the structural wafer arrangement is structured. In a subsequent further dry-etching step, the connecting layer is selectively removed in such a way that the seismic mass can carry out an excitation oscillation and the seismic mass or parts thereof can carry out a detection oscillation on the basis of a Coriolis force relative to the substrate wafer arrangement. The wafer stack arrangement makes it possible to integrate e.g. a monolithic circuit in the substrate wafer before the wafers are connected, and to apply a metallization to the substrate wafer which, too, can be structured before the wafers are connected, so as to form e.g. detection electrodes for a capacitive detection method.

21 Claims, 5 Drawing Sheets

MICROMECHANICAL ROTATION RATE SENSOR AND METHOD FOR PRODUCING THE SAME

The present invention relates to sensors and in particular to micromechanical rotation rate sensors and methods for producing the same.

Micromechanical rotation rate sensors have been known for considerable period of time. They comprise one or several micromechanically structured seismic oscillating masses which are subjected to a controlled periodic movement (excitation movement) in a plane (excitation oscillation plane). These seismic oscillating masses are structured and fastened such that they or parts of them are suspended so as to be movable also in a plane at right angles to the excitation oscillation plane. This plane is determined as detection plane. These rotation rate sensors also comprise a detection unit which detects a deflection of the oscillating mass or of the oscillating mass or parts thereof in the detection plane.

The deflection in the detection plane either results from the Coriolis force $F_C$ on the moved oscillating masses in the case of linear oscillators, or it results from the angular momentum conservation in the case of rotational oscillators. The deflection depends on the rotational speed $\Omega$, which is also referred to as rotation rate, and on the speed of the excitation movement (v or $\omega$). The deflection is directed perpendicular to the original excitation movement. Hence, the detection unit can convert the detection of the movement in the detection plane into a rotational speed or rotation rate of the sensor:

$$F_C = 2\ mv \times \Omega$$

$$M = \Theta \omega \times \Omega$$

The peculiarity of sensors used for detecting rotation rates e.g. in comparison with accelerations sensors is that an excitation movement of the seismic oscillating masses is required, such an excitation movement being, of course, not necessary in the case of acceleration sensors. The rotation rate can be measured only indirectly via the speed or rotational speed of the additional excitation movement, which should, however, not have any further influence on the detection. This necessitates a large number of degrees of freedom of movement.

Various production technologies and their boundary conditions limit the possibilities of realizing the structures so that the arrangement must be adapted to the production technologies used. The production technology must therefore be compatible with the complex structure of the whole rotation rate sensor.

Various realization principles in combination with different production techniques are known in the prior art.

DE 195 00 800, for example, shows rotation rate sensors comprising two masses which oscillate linearly relative to one another. The masses are formed by structuring polysilicon that has been grown epitactically on a substrate.

DE 195 23 895 shows rotation rate sensors as rotational oscillators utilizing the angular momentum conservation. These rotation rate sensors are produced in a manner which is similar to that described in DE 195 00 800.

DE 195 28 961 shows rotation rate sensors in the form of a tuning fork, the two prongs being structured from different wafers an subsequently combined so as to obtain the sensor.

WO 98/15799 discloses rotation rate sensors with decoupled orthogonal primary and secondary oscillators which can be produced by means of micromechanical processes, micromechanical surfaces technologies or in a way similar to that described in DE 195 00 800.

The known production methods show a plurality of disadvantages. When surface micromechanical techniques are used for structuring on grown polysilicon the oscillating masses, the torsion bars and torsion springs and the suspensions, stresses will occur in the micromechanical element which are caused by the epitactically grown polysilicon. These stresses result in a change in the mechanical behaviour.

Furthermore, epitactically grown polysilicon can only be produced up to a certain height, whereby the sensor element will be limited to a certain height. It follows that sufficient freedom for determining an optimum aspect ratio of structures does not exist; this may have a disadvantageous effect on the dimensioning, the sensor resolution and the interference susceptibility of the micromechanical rotation rate sensor.

Epitactically grown polysilicon is additionally subjected to ageing processes, in particular when it is constantly acted upon by a mechanical load, whereby the properties of the micromechanical rotation rate sensor may deteriorate with time. This kind of micromechanical rotation rate sensor will age.

DE 195 28 961 discloses with regard to the production of rotation rate sensors in the form of a tuning fork that the oscillating masses of the rotation rate sensor are produced from a plurality of SOI wafers, which have been preprocessed by bulk-micromechanical techniques, these oscillating masses being then connected so as to form sensors. A substantial disadvantage of this method is that the prongs of the fork are not adjusted in a sufficiently precise manner relative to one another and that it is difficult and expensive to match the mechanical properties. A further disadvantage is to be seen in the use of bulk-micromechanical technologies for structuring the prongs, whereby the possibilities of dimensioning the structures are strongly limited.

DE 195 26 903 A1 discloses a rotation rate sensor consisting of a multilayer substrate having a lower silicon layer and an upper silicon layer. The two silicon layers have provided between them an insulating sacrificial layer. The lower silicon layer is implemented as a silicon wafer having a silicon oxide layer, a silicon nitride layer or glass applied thereto as a sacrificial layer. The upper silicon layer is produced by deposition from a plasma or by bonding a further silicon wafer to the sacrificial layer. The upper silicon layer may comprise polycrystalline silicon material, monocrystalline silicon material or a mixture of poly- and monocrystalline silicon materials.

The technical publication by A. Benitez, et al, which is entitled "Bulk Silicon Microelectromechanical Devices Fabricated from Commercial Bonded and Etched-Back Silicon-on-Insulator Substrates", Sensors and Actuators, A 50 (1995), pp. 99–103, discloses so-called BESOI substrates. BESOI stands for "bonded and etched-back silicon-on-insulator". A BESOI substrate is produced as follows. A starting substrate consisting of silicon is provided with an intermediate silicon dioxide layer. This intermediate silicon dioxide layer has applied thereto a further silicon wafer by means of wafer bonding or by means of wafer fusion, whereupon one of the two silicon wafers is etched back to the desired thickness. The silicon dioxide layer provided between the two wafers can be used as a sacrificial layer so as to produce electrostatic micromotors, microturbines and electrostatically operated microrelays.

It is the object of the present invention to provide a concept for micromechanical rotation rate sensors that can be produced at a moderate price, this concept permitting in addition a great freedom of design.

This object is achieved by a micromechanical rotation rate sensor according to claim 1 and by a method for producing a micromechanical rotation rate sensor according to claim 14.

One advantage of the present invention resides in the fact that it provides micromechanical rotation rate sensors which consist of a suitable material and in the case of which a very great freedom of design exists, without any necessity of matching the structures.

The present invention is based on the finding that the concept of a one-part rotation rate sensor, which is produced from a single wafer with epitactically grown polysilicon or with an SOI structure, must be departed from so as to achieve an optimum freedom of design and an economy-priced producibility. Hence, a micromechanical rotation rate sensor according to the present invention comprises a substrate wafer arrangement, a structural wafer arrangement in which there are defined at least one seismic mass, the suspension of this seismic mass and at least one spring means for connecting the suspension to the seismic mass, and an insulating connecting layer which mechanically connects the substrate wafer arrangement to the structural wafer arrangement in such a way that the seismic mass can carry out an excitation oscillation and that the seismic mass or parts thereof can carry out a detection oscillation on the basis of a rotation rate relative to the substrate wafer arrangement.

It follows that the micromechanical rotation rate sensor is based on a wafer stack arrangement, whereby the wafer arrangement for the substrate and for the rotation rate sensor as well as the materials of the rotation rate sensor can be chosen completely independently of one another and whereby the wafers can, in addition, be partly preprocessed before they are connected. In contrast to SOI substrates or substrates with grown polysilicon, the thickness of the structural layer, i.e. of the springs, the seismic masses, etc., can be chosen absolutely freely, simply by choosing a wafer having the desired thickness and by glueing it to the substrate wafer arrangement by means of the connecting layer, which can consist of polymer or of some other organic material, or by connecting a structural wafer via the connecting layer to the substrate wafer, which is then adjusted to the desired height. The connecting layer has the additional advantage that it can be used as an etch stop layer for the structuring process and as a sacrificial layer for obtaining freestanding structures.

According to a preferred embodiment with capacitive detection of the movement of the seismic mass on the basis of the Coriolis force, the substrate wafer arrangement comprises a metallization which is structured so that it comprises at least the detection electrodes. The metallization can easily be applied to a semiconductor wafer prior to connecting the metallized wafer via the connecting layer to the structural wafer. The complexity of the arrangement can be reduced in this way, since it is not necessary to pay attention to the fact that all electrodes have to be located on top of the structure, as may e.g. the case with SOI rotation rate sensors.

The layer or wafer stack arrangement leads to an arrangement which is optimal for the use of suitable material, the structuring of the elements and the positioning, dimensioning and application of the structures as well as the use of suitable excitation and detection units. The wafer stack arrangement permits the greatest possible freedom with respect to the design of the rotation rate sensors and with respect to different detection units. The excitation oscillation can be excited by various methods, such as piezoelectric, electrostatic, electromagnetic, electrothermal, inductive or thermomechanical methods. The detection of the measuring effect can also be realized by various detection units, among which e.g. the piezoresistive, the capacitive, the inductive, the optical, the piezoelectric and the thermomechanical ones should be mentioned. In the case of rotation rates with different excitation and detection units, the excitation oscillation can be realized as linear oscillation, as rotational oscillation or as torsion. Also for the detection a linear deflection or oscillation, a rotational oscillation or a torsion can be utilized.

In the following, preferred embodiments of the present invention will be explained in more detail with reference to the drawings enclosed, in which.

Figure 1:
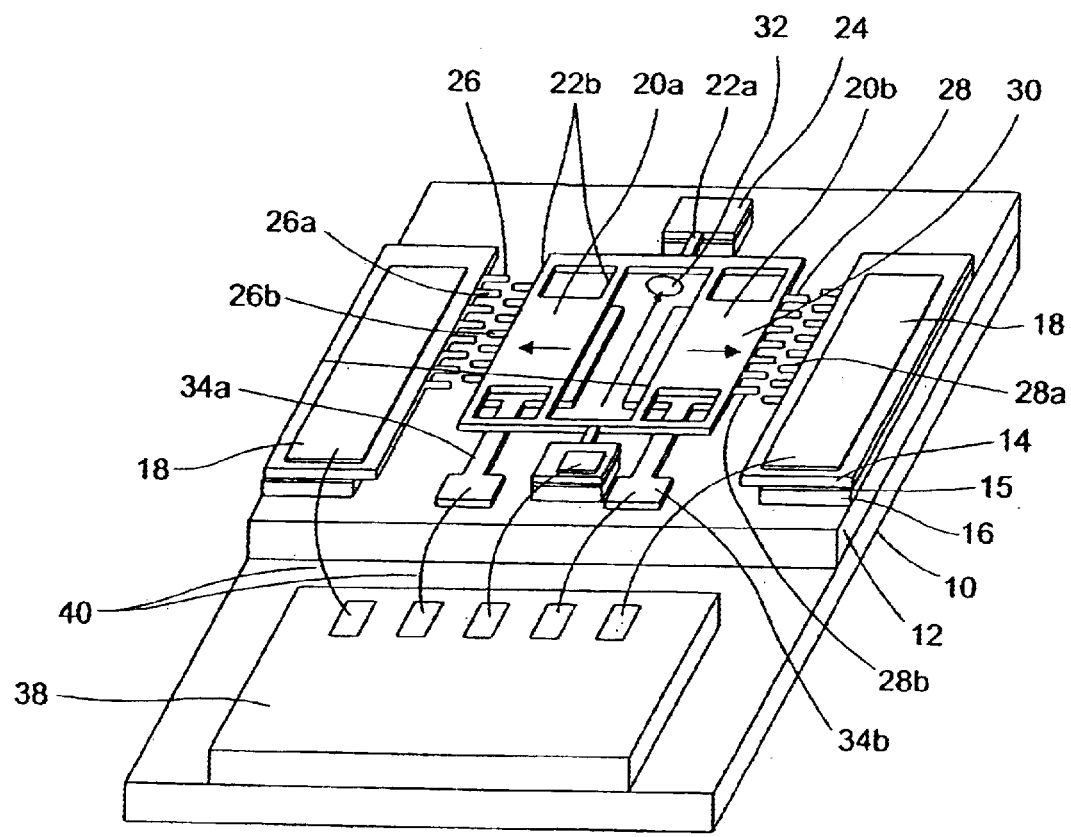
FIG. 1 shows a perspective view of a rotation rate sensor according to the present invention.

FIG. 1 shows a rotation rate sensor according to the present invention which is applied to a circuit substrate 10 that may consist of ceramics. The rotation rate sensor comprises a substrate wafer arrangement 12 and a structural wafer arrangement 14 which are connected by means of a connecting layer 15, the substrate wafer arrangement comprising in addition an optional metallization 16, whereas the structural wafer arrangement comprises a metallization 18 which is optional as well. The micromechanical rotation rate sensor additionally includes two seismic masses 20a, 20b which oscillate linearly relative to one another and which are connected to a suspension 24 via a spring means including a torsion bar 22a as well as a flexural bar 22b. The two seismic masses are caused to oscillate in phase opposition, as indicated by arrows 30, by means of two electrostatic drive units 26 and 28 operated in phase opposition. Each electrostatic comb drive unit 26 and 28 comprises a stationary portion 26a and 28a and a movable portion 26b and 28b, each of the movable portions being connected to a seismic mass 20a and 20b, respectively.

When the micromechanical rotation rate sensor shown in FIG. 1 is caused to rotate, as indicated by arrow 32, about an axis which is parallel to the longitudinal direction thereof, the seismic masses 20a and 20b will, due to their antiphase excitation, undergo an antiphase deflection as a result of the Coriolis force; this antiphase deflection can be detected by means of detection electrodes 34a, 34b. Since the left seismic mass 20a is drawn away from the substrate wafer arrangement 12 by the Coriolis force, when the right seismic mass 20b is drawn towards the substrate wafer arrangement, the two electrodes 34a, 34b constitute a differential capacitance detection which is detected via bonding wires 40 by an application-specific IC component 38 and evaluated.

In addition to the bonding wires for the two detection electrodes 34a, 34b there are further bonding wires leading to the suspension located opposite the suspension 24 and to the stationary portions 28a, 26a of the comb drives. Preferably, the arrangement comprising the seismic mass, the torsion bar and the suspension is connected to ground in such a way that there is a fixed reference potential both for excitation and detection. The stationary portions of the comb drives 28a, 26a have applied thereto suitable alternating voltages, which are supplied from the integrated circuit 38 via bonding wires connected to the metallization 18.

Hence, FIG. 1 shows a rotation rate sensor in the form of a linear oscillator in a layer arrangement or wafer-stack arrangement with two seismic masses 20a, 20b oscillating in phase opposition, which is integrated in a hybrid manner, i.e. in the case of which a prefabricated application-specific IC circuit is used for excitation and detection and evaluation, respectively. Alternatively to the embodiment shown in FIG. 1, the two suspensions 24 can be replaced by only one suspension which is provided in the middle so as to maintain the seismic masses movable relative to the substrate wafer arrangement 12. Alternatively, a piezoresistive detection in the form of resistors implanted in the torsion bar 22a may be provided instead of the detection electrodes which execute capacitive detection. The metallization of the substrate wafer arrangement 12 would then not be required. In his case it would suffice to take a semiconductor wafer only as substrate wafer arrangement 12, and to apply thereto via the connecting layer 14 another semiconductor with a metallization as the structural wafer arrangement. The metallization 18 of the structural wafer arrangement can also be dispensed with, provided that a suitable excitation or detection method is used in the case of which such a metallization is not required.

Figure 2A:
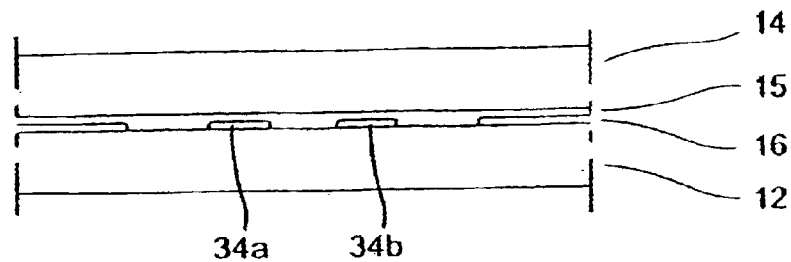
FIG. 2 shows a representation for illustrating the production of a rotation rate sensor according to the present invention.
Figure 2B:
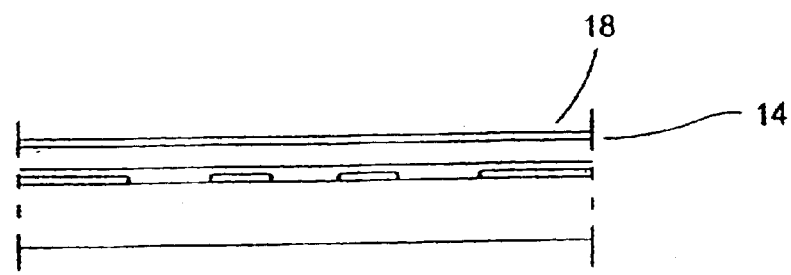
Figure 2C:
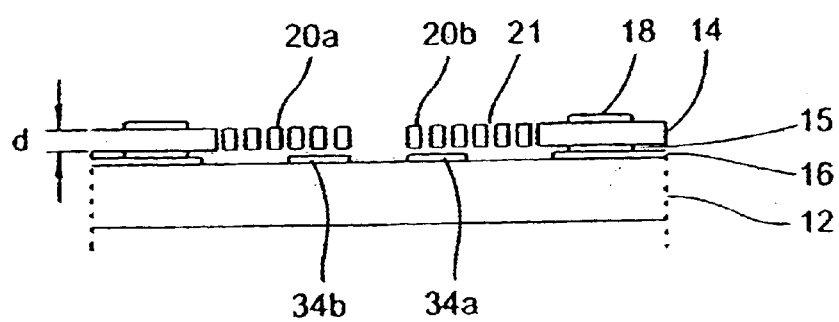

FIG. 2 shows a phase in the production of the micromechanical rotation rate sensor according to the present invention. The uppermost drawing of FIG. 2 shows a substrate wafer arrangement comprising a substrate wafer 12 and a structurable metallization 16 formed thereon. The substrate wafer arrangement 12, 16 is connected to the structural wafer 14 via the connecting layer 15. In the second drawing of FIG. 2, it can be seen that the structural wafer can also have added thereto a metallization 18 so as to form a structural wafer arrangement 14, 18. A substrate wafer 12 is first taken and provided with the metallization 16, this metallization 16 being then subjected to suitable structuring so as to form e.g. the detection electrodes 34a, 34b. The substrate wafer arrangement, which includes the substrate wafer 12 and the metallization 16, has then the connecting layer 15 applied thereto, whereupon the structural wafer arrangement 14, 18 is placed onto the connecting layer 15 for mechanically connecting these two components, e.g. by means of an adhesive. Prior to the application of the metallization 18, the structural wafer can be thinned.

As can be seen in the lower representation of FIG. 2, the structural wafer arrangement 14, 18 is then treated in such a way that the optional metallization 18 is defined by known techniques so as to form connecting areas for the stationary portions 28a and 26a, respectively. Subsequently, the structural layer is structured by means of a structuring step, which is preferably carried out as a dry-etching step. The seismic masses 20a, 20b and the respective flexural bars, torsion bars etc. are produced in this way.

The connecting layer 15 acts as an etch stop for this dry-etching step. The connecting layer 15 below the components, which are intended to be freely movable, serves as a sacrificial layer and is removed in a subsequent additional dry-etching step.

In order to remove the connecting layer 15 below the normally planar seismic masses, through holes 21 are provided in the seismic masses. These through holes 21 are also formed during the structuring step. The sacrificial layer is removed by means of a selective dry etching method, which will etch only the connecting layer 15 and attack neither the metallic materials nor the wafer materials. From the lower drawing of FIG. 2 it can be seen that, when planar seismic masses are used, this etching method must also have a certain lateral etching rate such that the seismic masses can hang freely. If the masses used are, however, not planar, but are, rather, rod-shaped, the through holes 21 can be dispensed with. In this case the lateral etching rate will suffice to permit the rather narrow masses to hang freely.

The material used for the substrate wafer 12 as well as for the structural wafer 14 is preferably monocrystalline silicon. Prior to applying the metallization 18 to the structural wafer, this structural wafer is preferably thinned until a certain thickness d has been reached. Only then is the structuring carried out. For thinning the wafer, known technical methods can be used. These methods offer, on the one hand, the advantage that they can be executed at a moderate price and, on the other hand, the advantage that substantially all the elements of the rotation rate sensor which are defined by the structural layer have the same thickness d. A mechanical trimming of oscillating structures after the production, e.g. by means of laser ablation or the like, will then not be necessary. The arrangement shown in FIG. 2 is particularly suitable for the rotation rate sensors according to the present invention, since the thickness or height d of the structural wafer 14 is almost arbitrary and can therefore also be adjusted to have an almost arbitrary size, whereby a big and consequently also heavy oscillating mass is obtained, which will provide a higher sensitivity of the sensor. A sensor having a high height h will, in addition, be less susceptible to interference caused by accelerations at right angles to the wafer stack arrangement and also levitation effects will be suppressed more strongly. In addition to the great height d that can be achieved, monocrystalline silicon also offers better sensitivities, better long-term stabilities and better dimensioning possibilities.

Figure 3:
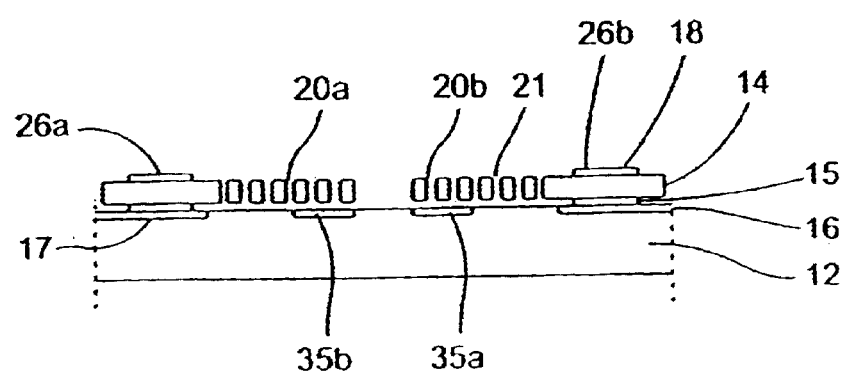
FIG. 3 shows a cross-sectional view of a rotation rate sensor according to the present invention with buried electrodes.

FIG. 3 shows an arrangement which is similar to that shown in FIG. 2; this arrangement has, however, not defined therein electrodes 34a, 34b in the form of a metallization of the substrate wafer 12, but it has formed therein implanted electrodes 35a, 35b. As an alternative, the substrate wafer can be provided with depressions, the electrodes being formed by the metallization in these depressions.

The buried electrodes can be produced e.g. by implanting the substrate wafer 12 at the locations in question. As can be seen from FIG. 2 and 3, the stationary portions 26a and 26b, respectively, have also provided below them metallization layers 16 (FIG. 2) and 17 (implanted low-resistance layer, FIG. 3). This means that the substrate wafer 12 is connected via the metallization layers 16 and 17, respectively, to the connecting layer 15 and then to the structural wafer. This metallization layer at the connection points is not absolutely necessary.

Since a wafer stack arrangement is, however, used according to the present invention, the substrate wafer being first metallized so as to form a substrate wafer arrangement, whereupon the metallization is structured in a suitable manner, many individual rotation rate sensors can be structured on one "mother wafer". It is not necessary to remove the above-mentioned metallization at the boundary areas of the individual rotation rate sensors. The metallization may, however, be removed, if necessary, or if a minimum height of the seismic masses above the substrate wafer 12 is required, or if a thicker connecting layer 15 is to be applied. When a mother wafer for the substrate wafer arrangement and a mother wafer for the structural wafer arrangement have been connected via the connecting layer, and when the structuring and the sacrificial layer etching have taken place, the "mother wafer stack arrangement" is divided so as to obtain the individual micromechanical rotation rate sensors which are then glued onto the basic substrate 10 and connected to the integrated circuit 38.

Preferably, the structural wafer arrangement is thinned to a thickness d which is at most 50 times, and preferably 20 to 30 times as the thickness of the insulating organic connecting layer. Together with the lateral dimensions of the elements defined by structuring the structural wafer arrangement, a predetermined thickness d allows to determine a spring constant of the spring means and the mass of the seismic mass.

Figure 4:
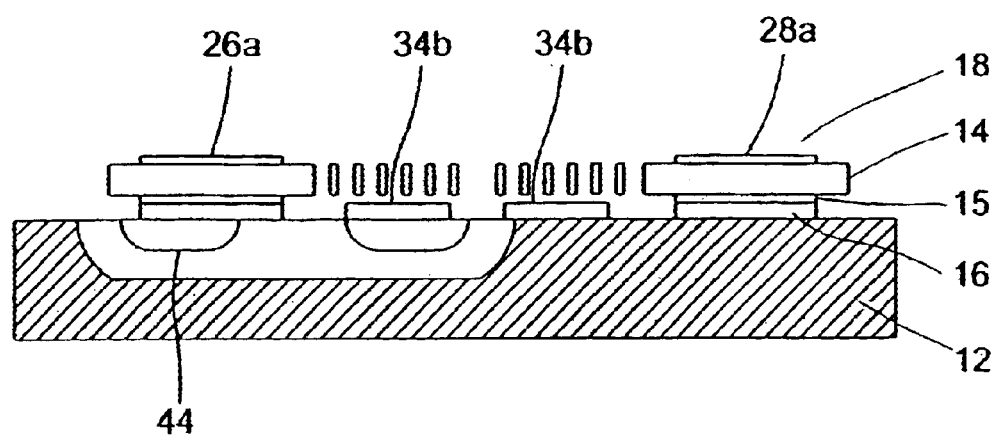
FIG. 4 shows a cross-sectional view of a rotation rate sensor according to the present invention with a monolithically integrated circuit.

FIG. 4 shows an embodiment which is an alternative to the embodiment according to FIG. 3 and in the case of which an integrated circuit 44 is monolithically integrated in the substrate wafer arrangement. In the case of this embodiment the bonding wires 40 can be dispensed with. The electrodes 34a, 34b can be connected directly to a circuit arrangement integrated in the substrate wafer below or beside these electrodes, whereas the metallizations 18 of the stationary comb drive means 26a, 28a still have to be connected downwards to the metallization of the substrate wafer arrangement, as indicated by FIGS. 7 and 8 which will be explained later on.

Figure 5:
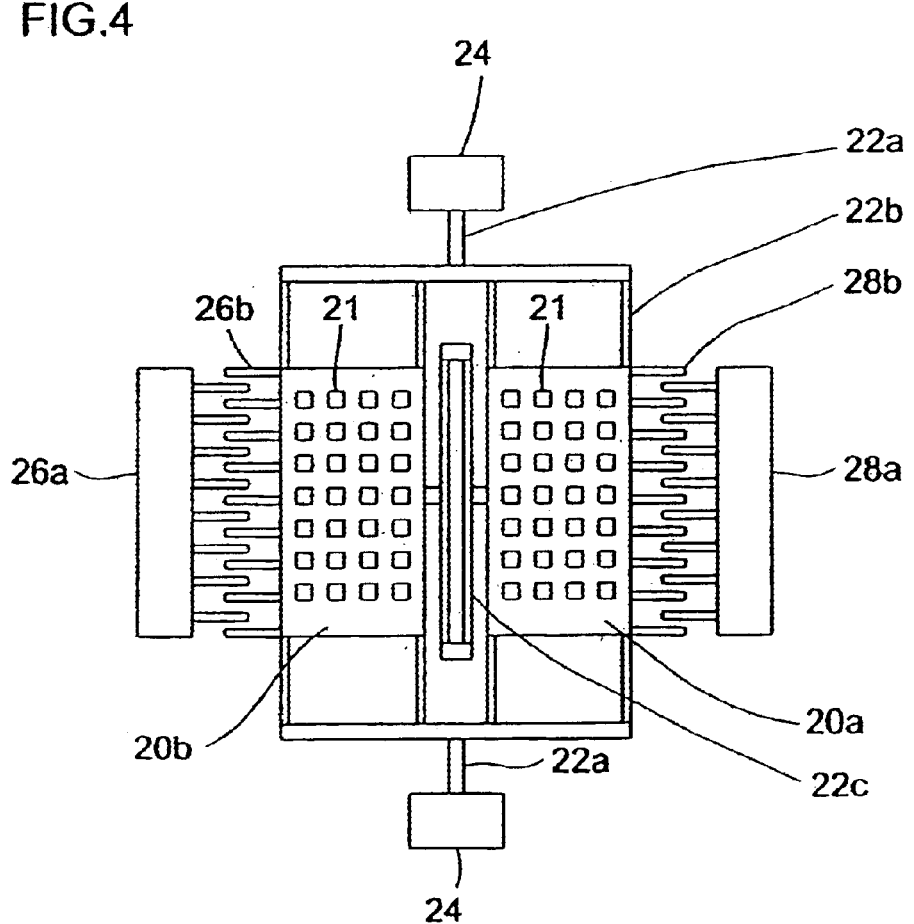
FIG. 5 shows a top view of the structural wafer arrangement of a rotation rate sensor according to the present invention.

FIG. 5 shows a further embodiment for the structural wafer arrangement after the structuring of a rotation rate sensor according to the present invention. The rotation rate sensor shown in FIG. 5 differs from rotation rate sensor shown in FIG. 1 insofar as it comprises additional flexural bars 22c, which interconnect the seismic masses 20a, 20b, only the structured structural wafer arrangement of the rotation rate sensor according to FIG. 5 being shown in FIG. 5. The linear oscillator shown in FIG. 5, which comprises two seismic masses coupled via the connecting bar 22c, shows an excellent oscillation mode separation. Due to the coupling 22c, the cophasal and the antiphase oscillations of the seismic masses have different resonant frequencies. The big seismic masses 20a, 20b comprise the through holes designated by reference numeral 21 for sacrificial layer etching. By arbitrary height variation possibilities (d, FIG. 2), the torsion bar 22a can be influenced by the height alone, whereas the height has here no influence on the flexural bars 22b, such that the resonant frequencies can be tuned to one another by adjusting the height alone.

Figure 6:
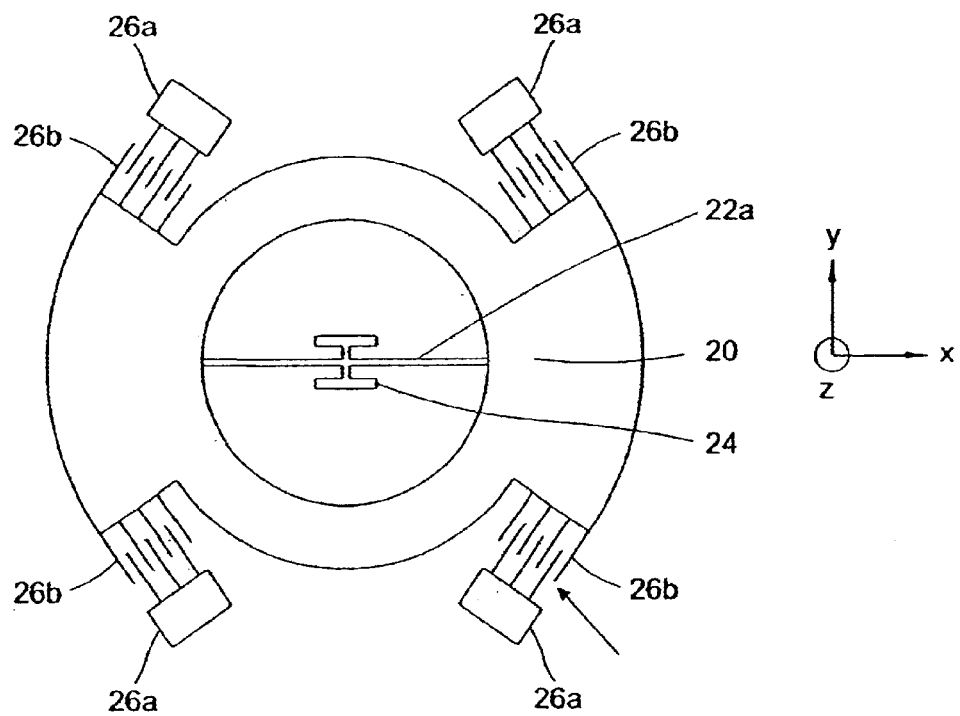
FIG. 6 shows a top view of the structural wafer arrangement of another rotation rate sensor according to the present invention.

FIG. 6 shows a rotation rate sensor according to a further embodiment of the present invention including only a single seismic mass 20 which is circular in shape an which is connected via flexural bars 22a to the suspension 24. Corresponding comb drives 26 having each a stationary portion 26a and a movable portion 26b connected to the seismic mass 20 are controlled appropriately for executing a circular excitation oscillation in the plane of projection. The rotational oscillator shown in FIG. 6 uses the torsion of the oscillator 20 about the axis x and about the y-axis for detecting two rotation rates which are perpendicular to each other. The suspension 24 is provided in the middle of the seismic mass 20 at only one point. The rotation rate directed in the direction of the y-axis results in a torsion of the seismic mass 20 about the x-axis, whereas the rotation rate directed parallel to the x-axis results in bending of the seismic mass 20 about the y-axis. The excitation oscillation created by the comb drives 26 takes place about the z-axis.

Figure 7:
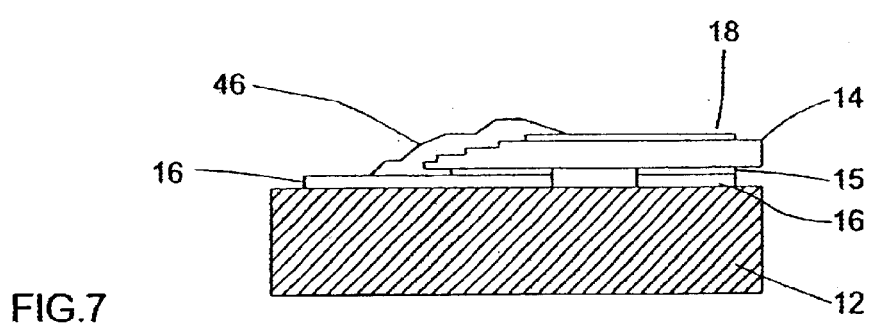
FIG. 7 shows a cross-sectional view of part of a rotation rate sensor according to the present invention for illustrating a metallization connection.
Figure 8:
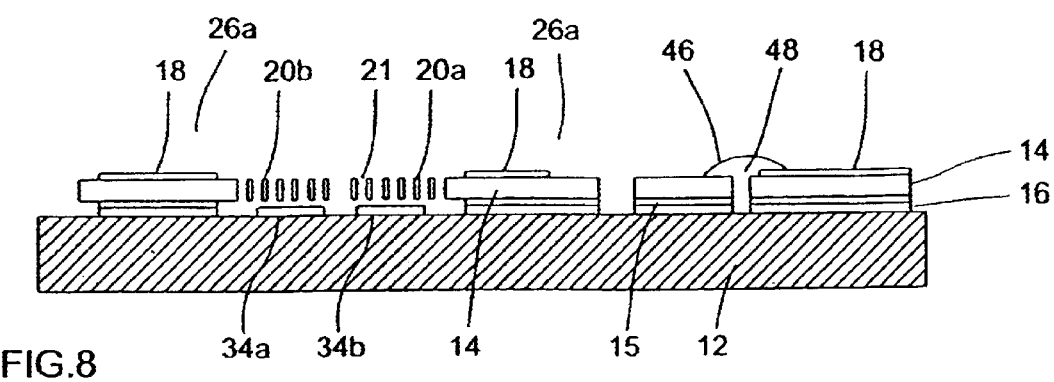
FIG. 8 shows a cross-sectional view of a rotation rate sensor according to the present invention for illustrating an alternative metallization connection.

FIGS. 7 and 8 show two different possibilities of obtaining a metallization connection from the substrate wafer arrangement, which comprises the substrate wafer 12 and the metallization 16, to the structural wafer arrangement, which comprises the structural wafer 14 and the metallization 18. In FIG. 7 a metallization connection 46 to the substrate wafer 14 is established in the case of which the structural wafer has been removed, whereas in FIG. 8 the structural wafer 14 has formed therein a window or hole 48 during the structuring of the structural layer, the window or hole 48 being then filled with the connection metallization 46 so as to connect the metallization plane 16 to the metallization plane 18. Making reference to FIG. 1, this has the advantage that all the bond areas of the rotation rate sensor can be placed on one level, e.g. the level of the metallization of the substrate wafer arrangement, so as to simplify the bonding operations, whereby they will be made more reliable. Making use of buried electrodes (35a, 35b, FIG. 3) in combination with an integrated circuit 44 (FIG. 4), a connection to the points to be contacted of the integrated circuit 44 can, alternatively, be established by means of conductor tracks, the circuit 44 being monolithically integrated in the substrate wafer 12 of the substrate wafer arrangement.

Although this is not shown in the figures, arbitrary rotation rate sensor structures can be produced, which may comprise at least one seismic mass that can be implemented as linear or rotational oscillator. Furthermore, any kind of flexural bars, e.g. folded flexural bars, can be used so as to obtain an excitation oscillation with a higher amplitude and a higher speed for increasing the measuring sensitivity.

Furthermore, rotation rate sensor structures can be produced, which are able to detect simultaneously two rotation rates that are perpendicular to each other, and rotation rate sensor structures can be produced in the case of which the detection of the rotation rate takes place in the structural wafer plane so that the metallization of the substrate wafer arrangement can be dispensed with.

Figure 9:
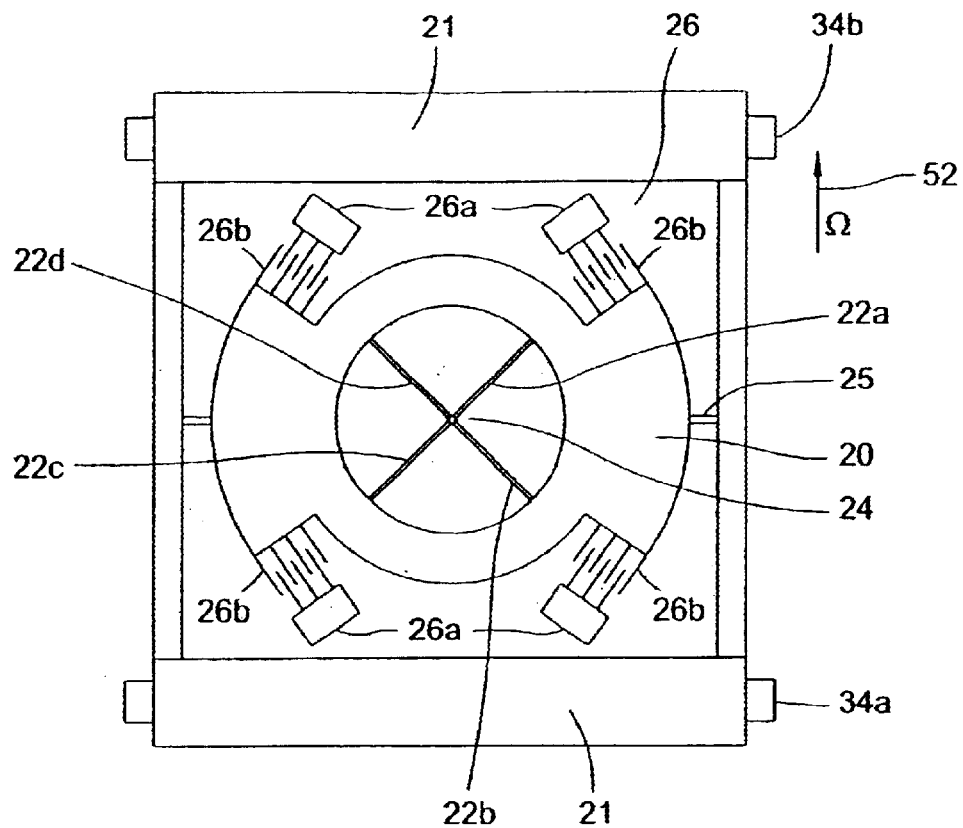
FIG. 9 shows a top view of the structural wafer arrangement of a further rotation rate sensor which can be produced according to the present invention.

FIG. 9 shows a rotation rate sensor according to a further embodiment of the present invention comprising a seismic mass 20 which is caused to execute rotational oscillations via four comb drives 26, each of these comb drives comprising a stationary portion 26a and a movable portion 26b. The oscillation is directed around the suspension 24 which is connected to the seismic mass 20 by means of four torsion bars 22a to 22d.

In contrast to the embodiment shown in FIG. 6, the rotation rate sensor shown in FIG. 9 comprises as seismic mass the seismic mass 20 and two additional seismic masses 21 which are connected to the seismic mass 20 via torsion bars. If the whole seismic mass 20, 21 is caused to execute rotational oscillations about the suspension point and if a rotation rate acts on the sensor which comprises at least one component in a direction indicated by an arrow 52, the Coriolis force produced will result in a deflection of the two additional seismic masses 21 at right angles to the plane of projection. It follows that, in the sense of the present invention, it is not necessary that the whole seismic mass, which is excited, is deflected by the Coriolis force. It will also suffice when a part of the seismic mass is deflected, in the present example the additional seismic masses 21.

The seismic masses 21 are metallized above the detection electrodes 34a, 34b, which are schematically indicated in FIG. 9, in such a way that a change in capacitance can be detected via a change in capacitance between the metallized seismic masses 21 and the electrodes 34a, 34b located below these seismic masses.

It follows that in the embodiment shown in FIG. 9, it is not the torsion of the seismic mass 20 but the tilting of the two additional seismic masses 21 that leads to the detection of the rotation rate. When electrostatic excitation is used, this has the advantage that, when the additional seismic masses 21 tilt, the capacitance of the excitation structures will not change. Attention should be paid to the fact that the suspension 24 at the centre is so stiff that the seismic mass 20 will not be tilted by the Coriolis force but that only the seismic masses 21 will tilt via the torsion bars 25. The excitation oscillation can be decoupled from the detection oscillation in this way.

At this point, it should be pointed out that through holes 21, which may be required both for the seismic mass 20 as well as for the outer masses 21, are not shown in the drawing for the sake of clarity. If the lateral etching rate of the process used should not suffice to etch the structures of the structural wafer arrangement which are shown in FIG. 9, the through holes 21 will have to be provided at the appropriate locations.

Figure 10:
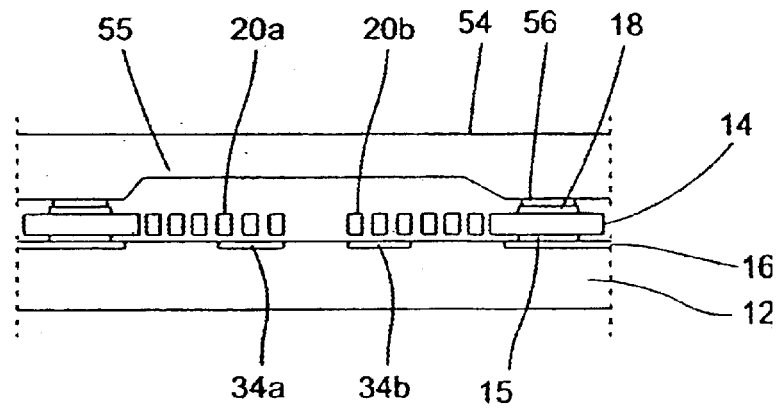
FIG. 10 shows a cross-sectional view of a rotation rate sensor according to the present invention provided with a cover wafer.

FIG. 10 shows a cross-sectional view through a rotation rate sensor structure according to the present invention, which is similar to the cross-sectional view of FIG. 2, but in the case of which a cover wafer 54 is provided, which is connected via a further connecting layer 56 to the structural wafer arrangement, in the example shown in FIG. 10 to the upper metallization 18. Hence, FIG. 10 shows a wafer stack arrangement that has been extended by the cover wafer 54, which may be preprocessed, so as to have e.g. the recess 55, shown in FIG. 10, above the seismic mass 20a and the seismic mass 20b. This cover wafer 54 serves to protect the structural wafer arrangement and, in addition, the whole rotation rate sensor and/or to evacuate the cavity between the cover wafer 54 and the substrate wafer. The evacuation has the advantage that movable parts of the structural wafer arrangement will not be influenced by air resistance. Alternatively, the cavity might be filled with a specific fluid so as to provide defined damping of the movable structures.

In comparison with known micromechanical rotation rate sensors, which do not include a wafer stack arrangement, the concept of wafer stacking for producing micromechanical rotation rate sensors according to the present invention offers a large number of advantages, only some of which are mentioned in the following:

The layer or wafer stack arrangement as well as the structuring of the rotation rate sensors can be realized simply, rapidly and at a moderate price and are suitable for mass production so that competitive advantages can be achieved.

A great variety of materials and semiconductor materials can be used for the layers or wafers, especially monocrystalline silicon can be used for the structural layer or structural wafer.

The layer or wafer connection, which defines simultaneously the distance between the substrate layers or wafers and the structural layers or wafers, can be adjusted with great variation possibilities with respect to the thickness; this will be of advantage in the case of a capacitive detection unit.

Various polymers (polyimides, epoxy resins, thermoplastic materials) or other organic materials can be used for the layer or waver connection; these materials can partially be removed subsequently in selective etching steps, especially in a dry-etching process.

The fact that dry-etching processes can be used prevents the structures that have been etched free from sticking to the substrate.

The thinning of the large-area structural layer or structural wafer results in uniform heights of the structural elements and permits the rotation rate sensors to be produced without trimming being necessary.

The thinning of the structural layer or structural wafer and consequently the height adjustment of the structure is carried out by means of simple methods, such as grinding and polishing.

The advantages of the micromechanical surface technologies for structuring the sensor structure can be used without any limitations.

The rotation rate sensors produced by micromechanical surface technologies are, due to their small size and due the high bar structures that can be used, robust against shock loads.

The structure can be defined in one etching step and consists of one part.

There are a great number of variation possibilities for adjusting the height of the structure.

By adjusting of the height of the structure, various resolutions can be adjusted.

On the basis of great heights, big masses can be realized whereby large measuring effects and high sensitivities can be achieved.

On the basis of great heights, interference effects, such as levitation, will be suppressed more effectively.

By means of the great height, linear accelerations at right angles to the layer or wafer stack arrangement can be suppressed more effectively.

On the basis of great heights, large-area capacitance arrangements can be used for the excitation of oscillations and, consequently, only low supply voltages will be necessary.

An optimum aspect ratio can be adjusted by means of the great variation of height adjustments and by making use of micromechanical surface technologies, whereby an optimum freedom of design can be achieved.

Due to the great freedom of design, the resonant frequencies of the two oscillations (excitation and detection oscillations) can optimally be tuned to one another. This is necessary in view of the fact that the excitation should take place at the resonant frequency so that a large deflection and, consequently, a large measuring effect can be achieved.

The optimally adjustable aspect ratio of the structure leads to a high selectivity in the various oscillation modes.

Since the height of the structure does not have any influence on the bending of flexural bars in the layer plane, but has a linear influence on the torsion, the resonant frequencies of torsion bars can be matched with those of the flexural bars by means of the height adjustment.

When monocrystalline silicon is used, ageing and fatigue phenomena of the material will be avoided.

When monocrystalline silicon is used, strain will not occur in the sensor structure that has been etched free.

Monocrystalline silicon has optimum mechanical and electrical properties.

When monocrystalline silicon is used, monolithic integration of the electronics will easily be possible.

On the basis of the layer or wafer stack arrangement, three-dimensional structures of the mechanical element, of the detection unit and of the evaluation circuit are possible.

On the basis of the production method, a good reproducibility and, consequently, economy-priced rotation rate sensors are possible.

The sequence of connecting the layers or wafers first and of structuring the structural layer or wafer subsequently has the effect that it is not necessary to trim the mechanical elements with respect to the oscillation properties.

The organic material used for the layer or wafer connection serves additionally as an etch stop, a sacrificial layer and a spacer layer so as to obtain freestanding structures.

A great variety of excitation and detection units can be used.

When a capacitive detection unit is used, the electrodes can be attached to the substrate wafer or they can be buried in the substrate wafer.

When buried electrodes are used, a plane surface for the layer or wafer connection will be obtained.

Metals or doped areas in the substrate layer can be used as electrodes.

The necessary evaluation circuit can be monolithically integrated or realized by hybrid integration.

In the case of a capacitive detection unit with hybrid integration of the evaluation circuit, the necessary bonding on the lower electrode can take place also on the upper electrode through a connection to the upper conductive layer.

By structuring the structural layer or wafer such that holes or windows are formed therein and by subsequently filling these holes or windows with conductive material, such as metal, the bonding can take place on the surface of the structural layer.

What is claimed is:

1. A micromechanical rotation rate sensor provided with a wafer stack arrangement, comprising:
    a substrate wafer arrangement;
    a structural wafer arrangement in which there are defined at least one seismic mass, the suspension of said seismic mass and at least one spring means for connecting the suspension to said seismic mass; and
    an insulating organic connecting layer which mechanically connects the substrate wafer arrangement to the structural wafer arrangement in such a way that the seismic mass can carry out an excitation oscillation and that at least part of the seismic mass can carry out a detection oscillation on the basis of a rotation rate relative to the substrate wafer arrangement.

2. A micromechanical rotation rate sensor according to claim 1, wherein the substrate wafer arrangement includes a substrate wafer and a metallization on the substrate-wafer side facing the insulating organic connecting layer, the metallization having planar detection electrodes below the seismic mass so as to obtain a capacitive detection means of the detection oscillation on the basis of the Coriolis force.

3. A micromechanical rotation rate sensor according to claim 1, wherein the structural wafer arrangement additionally includes a comb drive means for producing an excitation oscillation of the seismic mass, a stationary portion of the comb drive means having a metallization through which an electric voltage can be applied to the comb drive means.

4. A micromechanical rotation rate sensor according to claim 1, wherein the seismic mass is provided with through holes which are arranged in such a way that, making use of lateral etching, the organic connecting layer below the seismic mass can be removed in such a way that the seismic mass can carry out the excitation oscillation and that at least part of the seismic mass can carry out the detection oscillation relative to the substrate wafer arrangement.

5. A micromechanical rotation rate sensor according to claim 1, wherein the substrate wafer arrangement includes buried electrodes below the seismic mass.

6. A micromechanical rotation rate sensor according to claim 1, wherein both the substrate wafer arrangement and the structural wafer arrangement may be provided with a semiconductor wafer consisting of monocrystalline silicon.

7. A micromechanical rotation rate sensor according to claim 3, wherein portions of the metallization of the substrate wafer arrangement and of the metallization of the structural wafer arrangement are connected via a connection metallization in such a way that connecting areas for the rotation rate sensor are located on the same level relative to the substrate wafer arrangement.

8. A micromechanical rotation rate sensor according to claim 1, wherein the thickness of the substrate wafer arrangement is at most 50 times, and preferably 20 to 30 times as thick as the thickness of the organic connecting layer.

9. A micromechanical rotation rate sensor according to claim 1, wherein a plurality of seismic masses is defined in the structural wafer arrangement.

10. A micromechanical rotation rate sensor according to claim 1, comprising in addition:
    an excitation and evaluation circuit which is monolithically integrated in the substrate wafer arrangement.

11. A micromechanical rotation rate sensor according to claim 1, wherein the organic connecting layer consists of a polymer.

12. A micromechanical rotation rate sensor according to claim 11, wherein the insulating organic connecting layer comprises polyimide, epoxy resin or thermoplastic materials.

13. A micromechanical rotation rate sensor according to claim 1, comprising in addition a cover wafer which is connected to the structural wafer arrangement in such a way that a cavity is formed between the substrate wafer arrangement and said cover wafer.

14. A method for producing a micromechanical rotation rate sensor comprising the following steps:
    a) providing a substrate wafer arrangement;
    b) providing a structural wafer arrangement;
    c) mechanically connecting the substrate wafer arrangement and the structural wafer arrangement by means of an insulating organic connecting layer so as to obtain a wafer stack arrangement;
    d) structuring the structural wafer arrangement of the wafer stack arrangement so as to define at least one seismic mass, a suspension and a spring means for connecting the suspension to the seismic mass; and
    e) removing the insulating organic connecting layer at least below the seismic mass in such a way that the seismic mass can carry out an excitation oscillation and that at least part of the seismic mass can carry out a detection oscillation on the basis of a rotation rate relative to the substrate wafer arrangement.

15. A method according to claim 14, wherein step a) comprises the following substeps:
    providing a semiconductor wafer;
    metallizing the semiconductor wafer; and
    structuring the metallization so as to form at least one electrode which is placed below the seismic mass so as to obtain the substrate wafer arrangement.

16. A method according to claim 14, wherein step a) comprises the following substeps:

providing a semiconductor wafer, forming in the semiconductor wafer a buried electrode, which is placed below the seismic mass, so as to obtain the substrate wafer arrangement.

17. A method according to claim 14, wherein step d) is carried out by dry-etching the structural wafer arrangement, the organic connecting layer acting as an etch stop.

18. A method according to claim 14, wherein step e) is carried out by dry-etching, only the organic connecting layer being selectively etched in said dry-etching step.

19. A method according to claim 18, wherein in step d) a plurality of through holes is formed in the seismic mass by structuring, and wherein in step e) the organic connecting layer is etched away in the through holes and laterally below the through holes.

20. A method according to claim 14, comprising the following additional step which is carried out prior to step b):

thinning the structural wafer arrangement to a predetermined thickness so as to determine together with the lateral dimensions of the elements defined in step d) a spring constant of the spring means and the mass of the seismic mass.

21. A method according to claim 14, comprising the following additional step which is carried out prior to step a):

monolithically integrating an excitation and evaluation circuit for the micromechanical rotation rate sensor in the substrate wafer of the substrate wafer arrangement.

* * * * *